(12) United States Patent
Stewart

(10) Patent No.: US 7,913,633 B2
(45) Date of Patent: Mar. 29, 2011

(54) FERTILIZER SPIKE INSERTION TOOL

(76) Inventor: Arlene Stewart, Hutto, TX (US)

( * ) Notice: Subject to any disclaimer, the term of this patent is extended or adjusted under 35 U.S.C. 154(b) by 0 days.

(21) Appl. No.: 12/391,708

(22) Filed: Feb. 24, 2009

(65) Prior Publication Data

US 2010/0212921 A1 Aug. 26, 2010

(51) Int. Cl.
*A01C 5/00* (2006.01)
(52) U.S. Cl. .......................... 111/92; 172/22
(58) Field of Classification Search ............ 172/21, 172/22; 111/95, 96, 92, 98
See application file for complete search history.

(56) References Cited

U.S. PATENT DOCUMENTS

| | | | | |
|---|---|---|---|---|
| 12,465 | A * | 2/1855 | Barnhart | 111/95 |
| 1,512,758 | A * | 10/1924 | Gravatt | 111/7.2 |
| 2,030,770 | A * | 2/1936 | Smith | 294/50.5 |
| 2,629,985 | A * | 3/1953 | McDowell | 173/91 |
| 2,998,087 | A * | 8/1961 | Iddings | 173/102 |
| 3,014,443 | A * | 12/1961 | Keyser et al. | 111/92 |
| 3,381,763 | A * | 5/1968 | Matson | 173/91 |
| 3,405,669 | A * | 10/1968 | Nimrick | 111/7.2 |
| 3,530,577 | A * | 9/1970 | Franklin et al. | 30/169 |
| 3,903,815 | A | 9/1975 | Winkler | |
| 4,101,088 | A * | 7/1978 | Stauth | 242/396.1 |
| 4,191,116 | A | 3/1980 | Allison, Jr. et al. | |
| 4,458,415 | A * | 7/1984 | Maher et al. | 30/164.6 |
| 4,676,538 | A | 6/1987 | Fiedler | |
| 4,694,760 | A | 9/1987 | Camp | |
| 4,934,287 | A * | 6/1990 | Guin et al. | 111/7.1 |
| 4,974,682 | A * | 12/1990 | Hoffman | 172/22 |
| 5,105,578 | A | 4/1992 | Fleuridas et al. | |
| 5,461,992 | A | 10/1995 | Scollard | |
| 5,487,236 | A * | 1/1996 | Moon | 47/48.5 |
| 5,492,181 | A * | 2/1996 | Grant | 172/22 |
| 5,558,030 | A | 9/1996 | Ward | |
| 5,622,122 | A * | 4/1997 | Adair | 111/106 |
| 5,802,996 | A | 9/1998 | Baxter | |
| 6,374,758 | B1 * | 4/2002 | Mickle et al. | 111/106 |
| 6,662,879 | B1 * | 12/2003 | Costa | 172/22 |
| 6,843,020 | B2 | 1/2005 | Lutz | |
| 6,920,938 | B1 | 7/2005 | Rotan et al. | |
| 7,117,954 | B2 * | 10/2006 | Vipond | 172/378 |
| 7,252,042 | B1 * | 8/2007 | Blake | 111/95 |
| 7,395,768 | B2 | 7/2008 | Blake | |
| 2006/0090911 | A1 | 5/2006 | Laramee | |

* cited by examiner

*Primary Examiner* — Robert E Pezzuto
*Assistant Examiner* — Jamie L McGowan
(74) *Attorney, Agent, or Firm* — Trop, Pruner & Hu, P.C.

(57) ABSTRACT

In one embodiment of the invention a fertilizer spike insertion tool includes a hammer coupled to a spring. When loaded the hammer is retained by a detention member and the spring is loaded (e.g., compressed or expanded). On releasing the detention member and unloading the spring, the hammer forcibly impacts a footrest and drives a hollow metal core into soil making a hole for a fertilizer spike.

19 Claims, 3 Drawing Sheets

FERTILIZER SPIKE INSERTION TOOL

BACKGROUND

Some gardeners, such as elderly or handicapped individuals, have difficulty performing gardening acts such as driving a fertilizer spike into the earth. Driving fertilizer stakes into normal ground can be difficult, but such a task made even more cumbersome in certain situations. For example, implanting spikes around trees can be difficult if the soil surrounding the tree is compacted and densely populated by roots. Thus, driving fertilizer stakes into the ground can force gardeners to kneel on the ground, sometimes with great discomfort, to pound fertilizer spikes into the earth. These efforts to insert the spikes into the earth can be especially frustrating when the gardener accidentally breaks the spike while pounding it into the ground.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure, descriptions of known devices and methods have been omitted to avoid clouding the description of the present invention with unnecessary detail.

Figure 1:
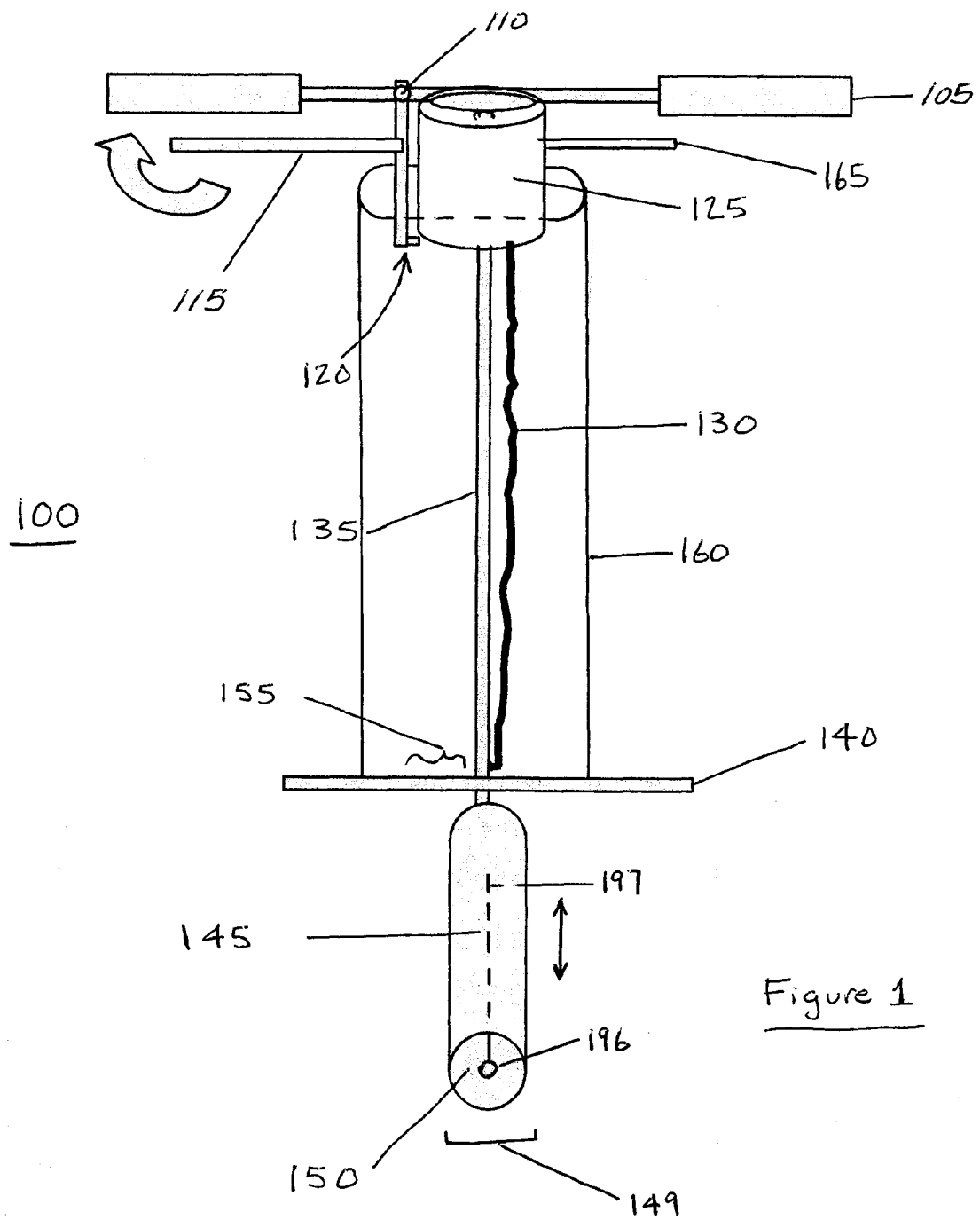
FIG. 1 includes a front view of a device in one embodiment of the invention.

FIG. 1 includes a front view of device 100 in one embodiment of the invention. A handle bar 105 may couple (i.e., connect directly or indirectly) to main body 135 and footrest 140. Handle bar 105 need not necessarily be horizontal or separate and apart from main body 135. Footrest 140 may include any surface coupled or included in other tool elements to allow foot or appendage purchase. Tool 100 may include distal end 145 to contact the earth. In other words, distal end 145 may be driven into earth (e.g., soil located in a garden, yard, or flower pot) to loosen the soil and create space for, as an example, a bulb or fertilizer spike or module. A weight, hammer, or striking member 125 may slidably couple to main body 135. Thus, weight 125 may, for example, slide up and down main body 135 (i.e., in respect in to main body 135). A portion of footrest 140 may operate as an impact member 155, whose use is described further below. Detention member 120 may couple to weight 125 and to trigger 115. A bias or resilient member (e.g., spring, elastic cord, or rubber strap) may couple to weight 125. In a loaded or cocked orientation, weight 125 may be deployed near handlebar 105 and may be retained by detention member 120. In advancing weight 125 towards handle bar 105, resilient member 130 may be expanded, loaded, or cocked thereby increasing tension in member 130. (In some embodiments the resilient member may be loaded by instead compressing (opposed to extending) the resilient member (e.g., spring) while still increasing potential energy that may be transferred to weight 125 to facilitate fertilizer spike insertion.) Trigger 115 may then rotate about bearing or pivot 110, thereby manipulating detention member 120 and releasing weight 125. Gravity and tension in resilient member 130 may cooperate to forcibly drive weight 125 down or along body 135 and against impact member 155, thereby driving distal end 145 into soil.

In an embodiment of the invention, tool 100 may include protective sleeve 160 which may shield hammer or weight member 125 as weight member 125 slides along main body 135. In one embodiment, weight 125 has a central cavity to accept main body 135 and allow weight 125 to slide along body 135. In other embodiments, weight 125 may slide along main body by, for example, sliding along a shaft that is parallel to main body 135. Sleeve or conduit 160 may include a slot or void to receive handle or extension 165, which may couple to hammer member 125 to aid in sliding hammer member 125 along main body 135 and into a loaded orientation wherein weight 125 is retained by retention member 120.

Figure 2:
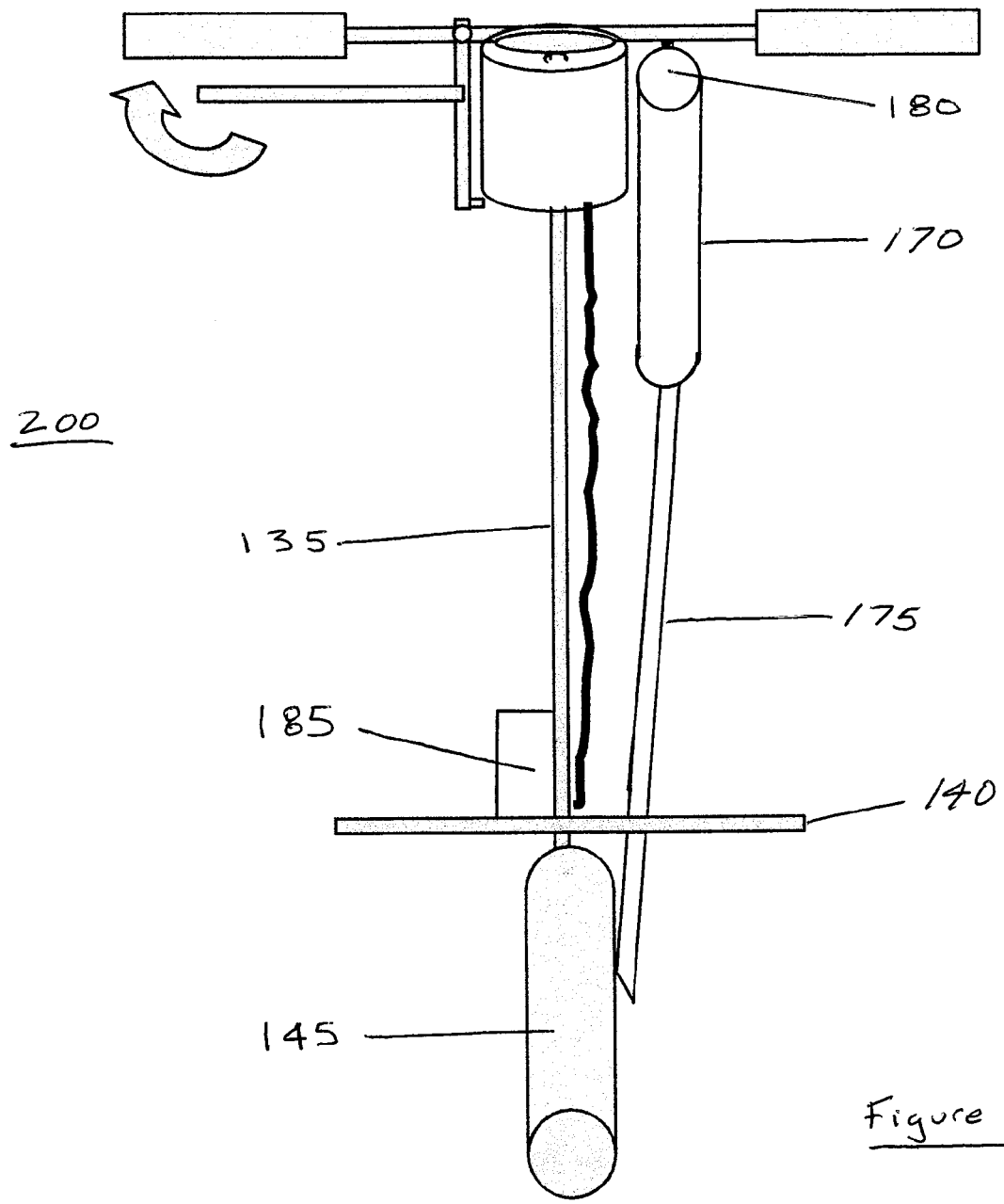
FIG. 2 includes a front view of a device in one embodiment of the invention.

FIG. 2 includes a front view of device 200 in one embodiment of the invention. In an embodiment of the invention, tool 200 may include conduit 175 coupled to distal end 145 and to reservoir 170. A liquid, such as water or fertilizer solution, may be included in reservoir 170, delivered into reservoir 170 at entry 180, and administered to the earth (i.e., soil or dirt or organic matter) via conduit 175 to soften and/or fertilize the earth.

In an embodiment of the invention, conduit 175 may couple to a water hose without use of a reservoir. Water from the water hose may then be administered to the earth via conduit 175. Conduit 175 may extend along main body 135 and/or distal end 145 to varying lengths. For example, conduit 175 may extend below footrest (pictured in FIG. 2) or terminate above or at footrest 140 or at varying locations along or in relation to main body 135.

In an embodiment of the invention, the tool may comprise a retention member to couple a water hose to the tool. This embodiment may forego use of conduit 175 and reservoir 170. Water may then be administered to the earth, for example, directly from the hose. In an embodiment of the invention, weight 125 may include a void. A removable material (e.g., sand, water) may be inserted into the void to add weight to weight 125. Thus, when not in use tool 200 may be lightweight and easy for the user to transport and handle. However, when in use the weight may be made heavier by adding water to weight 125. Also, a weight having a very large housing and void may have the potential to deliver significant impact when filled and ready for use. The ability to temporarily fill such a large housing allows for high impact force when the tool is ready for use and still allows for draining and portability when the device is ready to be transported back to the shed, garage, car or elsewhere.

Figure 3:
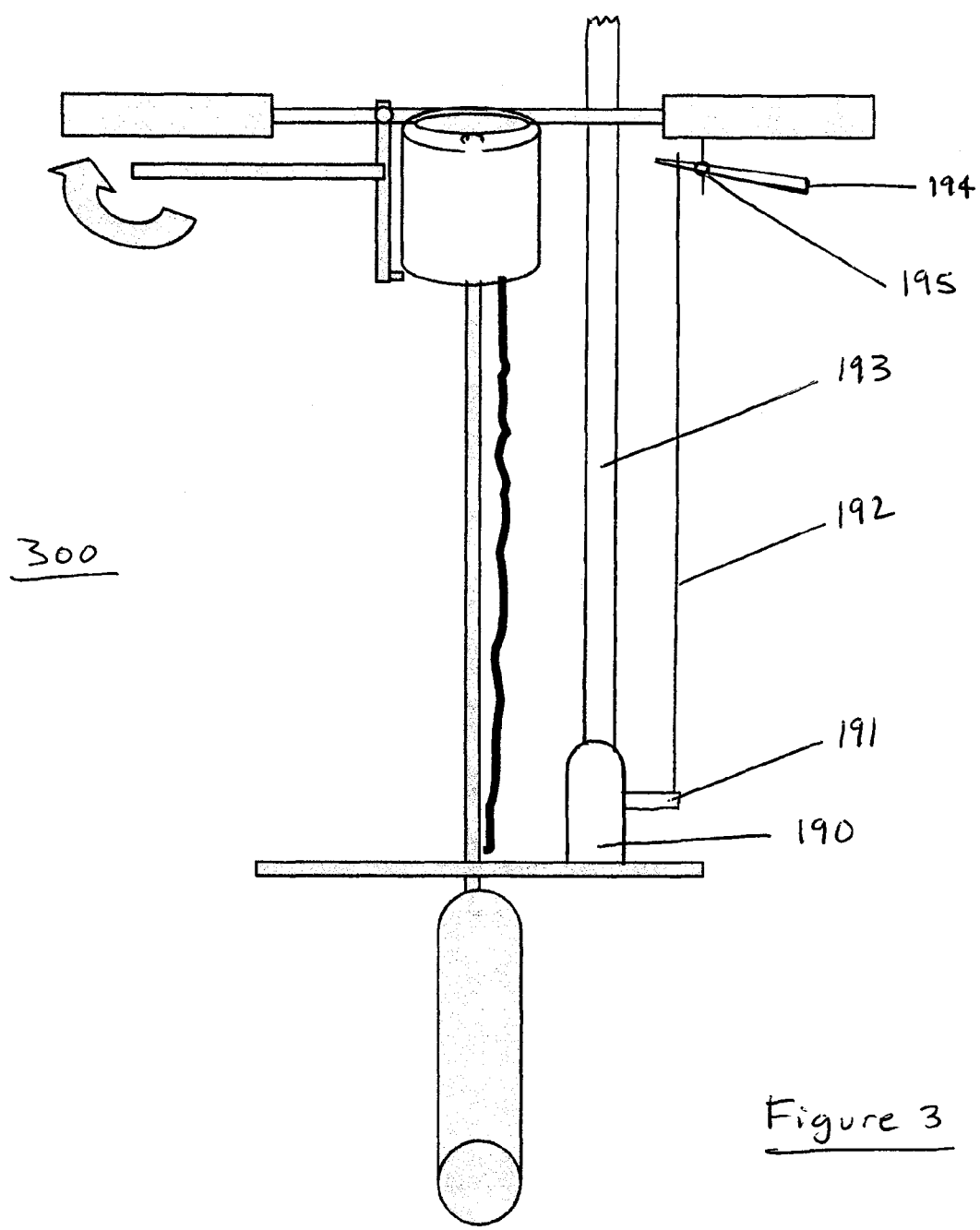
FIG. 3 includes a front view of a device in one embodiment of the invention.

FIG. 3 includes a front view of a device 300 in one embodiment of the invention. Tool 300 may include nozzle 190 to couple to conduit or water hose 193. Additional trigger 194 may cooperate with pivot 195 and extensions 191, 192 to open nozzle 190 to administer a liquid (e.g., water, fertilizer solution) to the earth.

Returning to FIG. 2, tool 200 may comprise a vibrating member 185 coupled to distal end 145 and a power source (e.g., battery, compressor, generator, AC outlet). When activated, vibrating member 185 may vibrate distal end 145 to soften the earth or generally facilitate driving end 145 into soil. In one embodiment of the invention, vibrating member 185 may include a 12 VDC vibrating motor such as a Panasonic "Micro-motor" #AKME-BC (or similar motors) which may include a ½ moon brass jumbo "flywheel" that may create a high amplitude vibration. Such motors are readily available.

In an embodiment of the invention, a distal end may include a solid closed tip. In other embodiments, such as FIG. 1, distal end 145 may include an open tip 149 for "coring" dirt (i.e., removing a core of dirt from the earth so a plug or spike may later be placed in the hole). Open tip 149 may be hollow (e.g., hollow conduit) and may further include a retention member to retain a fertilizer plug. The retention member may include an inner wall 150 of distal end 145. For example, the distance between inner walls 150 of tip 149 may be such that a fertilizer plug achieves a "resistance fit" within end 145. Furthermore, tool 100 may include ejection member 196 slidably coupled to distal end 145 to eject materials from distal end 145. Ejection member 196 may couple to arm 197 whereby arm 197 may be grasped or pushed to eject dirt cores or fertilizer plugs.

In an embodiment of the invention, distal end 145 may include a low resistance outer layer or coat (e.g., Teflon) to facilitate driving distal end 145 into the soil. Also, in one embodiment of the invention the hollow end 145 may already include a fertilizer spike when end 145 is first driven into the ground. The spike may be somewhat recessed within end 145 at the time of initial driving to prevent the spike from taking the brunt of force or initial contact with dirt, rocks, or roots. In other embodiments, a user may wish to first drive the core tip 145 into the ground, remove a core of dirt, insert a spike end 145, and then drive or place the spike into the newly formed recess or void.

In an embodiment, footrest 140 and/or impact region 155 may be excluded. In such a case, distal end 145 may include an impact region (e.g., top surface of end 145) for impact with weight 125. However, a distal end may be coupled to the weight so that the weight and the distal end are both slidably coupled to body 135. In that case, the distal end may actually travel down from, for example, the handle bar region and to the ground.

The following method is one example that may be used in cooperation with an embodiment of the invention. Using an embodiment such as tool 100 in FIG. 1, a user may rotate tool 100 so that distal end 145 is above (i.e., skyward and pointing up) handle 105. The user may then step on extension 165 (FIG. 1) coupled to weight member 125 to load and extend (or compress in some embodiments) resilient member 130 and engage weight 125 with detention member 120. The user may then rotate distal end 145 earthward (i.e., down), grasp trigger 115, and thereby release detention member 120. This may cause weight member to slam or impact member 155 to drive distal end 145 into soil.

The user may use any method to load the device and need not necessarily step on extension 165 or necessarily invert tool 100. A user may simply grab extension 165 and pull weight 125 into its loaded position.

Of course using other embodiments, such as tools 200 or 300 (FIG. 2 or 3), the user may wet the earth to facilitate driving end 145 into soil.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A garden tool apparatus comprising:
a main body coupled to a proximal handle, a distal member, and an impact member; and
a weight coupled to an elastic member and a detention member and slidably coupled to the main body;
wherein in a loaded orientation the weight is to be retained by the detention member and the elastic member is to be loaded so that, based on releasing the detention member and unloading the elastic member, the weight is to slide along the main body and hammer the impact member to drive the distal member into soil.

2. The apparatus of claim 1, further comprising:
a nozzle coupled to the main body and to couple to a water source; and
a trigger coupled to the nozzle to open the nozzle to administer water to the soil.

3. The apparatus of claim 1, wherein in the loaded orientation the weight is to be retained, in a static manner, by the detention member before unloading the elastic member to drive the distal member into soil.

4. A garden tool apparatus comprising:
a handle bar;
a main body coupled to the handle bar;
a footrest coupled to the main body;
a distal end to contact soil;
a hammer member slidably coupled to the main body;
an impact member coupled to the main body;
a detention member to couple to the hammer member;
a trigger coupled to the detention member; and
a resilient member coupled to the hammer member;
wherein in a loaded orientation the hammer member is to be retained by the detention member and the resilient member is to be expanded in tension so that upon manipulating the trigger the hammer member is to slide along the main body to forcibly contact the impact member and drive the distal end into the soil.

5. The apparatus of claim 4, further comprising a handle coupled to the hammer member to aid in sliding the hammer member along the main body and into the loaded orientation.

6. The apparatus of claim 4, further comprising a first conduit coupled to the main body and to a reservoir, wherein a liquid to be included in the reservoir may be administered to the soil via the first conduit to soften the soil.

7. The apparatus of claim 4, further comprising a first conduit to couple to a water hose, wherein water from the water hose may be administered to the soil via the first conduit.

8. The apparatus of claim 4, further comprising a retention member to couple to a water hose, wherein water from the water hose may be administered to the soil.

9. The apparatus of claim 4, further comprising:
a nozzle to couple to a water hose; and
an additional trigger to open the nozzle to administer water from the water hose to the soil.

10. The apparatus of claim 4, further comprising a vibrating member coupled to the distal end and to couple to a power source, wherein the vibrating member is to vibrate the distal end to soften the soil.

11. The apparatus of claim 4, wherein the distal end includes an open tip.

12. The apparatus of claim 9, wherein the distal end includes an open tip that further includes a retention member to retain a fertilizer plug.

13. The apparatus of claim 12, wherein the retention member includes an inner wall of the distal end.

14. The apparatus of claim 4, wherein the distal end includes a low resistance outer layer to facilitate driving the distal end into the soil.

15. The apparatus of claim 4, further comprising:
- a protective sleeve to include the hammer member and shield the hammer member as the hammer member slides along the main body;
- a handle coupled to the hammer member to aid in sliding the hammer member along the main body and into the loaded orientation;
- a first conduit coupled to the distal end and to a reservoir, wherein a liquid to be included in the reservoir may be administered to the soil via the first conduit to soften the soil; and
- an ejection member slidably coupled to the distal end to eject materials from the distal end;
- wherein a portion of the footrest includes the impact member.

16. The apparatus of claim 4, further comprising a vibration member coupled to the distal member and to couple to a power source, wherein the vibrating member is to vibrate the distal member to soften the soil.

17. A method comprising:
providing a garden tool apparatus that includes:
- a main body coupled to a distal member and slidably coupled to a weight;
- an impact member coupled to the main body; and
- a detention member and resilient member each coupled to the weight;

loading the resilient member and engaging the weight with the detention member while the resilient member is loaded;

maintaining the resilient member in the loaded state while positioning the distal member over a desired implant site; and impacting the weight against the impact member to drive the distal member into soil based on (a) releasing the detention member and (b) unloading the resilient member.

18. The method of claim 17, further comprising administering water to the soil by opening a conduit that is coupled to the main body and a water source.

19. The method of claim 17, further comprising administering water to the soil by manipulating a lever to open a nozzle that is coupled to the main body and a water source.

* * * * *

UNITED STATES PATENT AND TRADEMARK OFFICE
CERTIFICATE OF CORRECTION

PATENT NO. : 7,913,633 B2  Page 1 of 1
APPLICATION NO. : 12/391708
DATED : March 29, 2011
INVENTOR(S) : Arlene Stewart It is certified that error appears in the above-identified patent and that said Letters Patent is hereby corrected as shown below:

Column 6:
Line 1, "claim 4," should be --claim 1,--.

Signed and Sealed this
Seventh Day of June, 2011

David J. Kappos
*Director of the United States Patent and Trademark Office*